United States Patent [19]

Brubaker

[11] 4,169,693
[45] Oct. 2, 1979

[54] FLUID COUPLING DEVICE AND FAN MOUNTING ARRANGEMENT

[75] Inventor: Richard K. Brubaker, Warren, Mich.

[73] Assignee: Eaton Corporation, Cleveland, Ohio

[21] Appl. No.: 800,374

[22] Filed: May 25, 1977

[51] Int. Cl.² .............................................. F04D 29/34
[52] U.S. Cl. .............................. 416/93 R; 416/169 A; 416/229 R; 416/241 A
[58] Field of Search ............ 416/169 A, 93 R, 241 A, 416/229, 245 B, 214 R, 244 R

[56] References Cited

U.S. PATENT DOCUMENTS

| 3,642,382 | 2/1972 | Hayashi | 416/95 X |
| 3,749,519 | 7/1973 | Ryba | 416/241 A |

FOREIGN PATENT DOCUMENTS

| 861734 | 1/1953 | Fed. Rep. of Germany | 416/214 R |
| 1222326 | 8/1966 | Fed. Rep. of Germany | 416/169 A |
| 1950139 | 4/1971 | Fed. Rep. of Germany | 416/241 A |
| 2240011 | 2/1974 | Fed. Rep. of Germany | 416/241 A |
| 2361481 | 6/1974 | Fed. Rep. of Germany | 416/229 |
| 2329969 | 1/1975 | Fed. Rep. of Germany | 416/241 A |
| 2523230 | 12/1976 | Fed. Rep. of Germany | 416/229 |
| 997656 | 1/1952 | France | 416/214 A |
| 1234570 | 10/1960 | France | 416/245 B |

*Primary Examiner*—Everette A. Powell, Jr.
*Attorney, Agent, or Firm*—R. J. McCloskey; J. Yakimow; L. Kasper

[57] ABSTRACT

A fluid coupling device and fan mounting arrangement is disclosed. The fan is of the type having a hub portion and a plurality of fan blades integrally molded therewith from a plastic material and an annular spider having its outer periphery attached to the hub portion and a plurality of inwardly extending tabs bolted to bolt bosses projecting forwardly from the front surface of the output coupling member. The bolt bosses define a bolt circle having a radius $R_1$ and the output coupling member includes a plurality of pilot portions defining a pilot diameter of radius $R_2$, wherein $R_2$ is greater than $R_1$. The annular spider includes a plurality of inwardly extending pilot tabs, each of which engages the outer periphery of one of the pilot portions of the output member. The outboard pilot arrangement of the invention facilitates machining of the pilot diameter of the output member and minimizes the amount of surface-to-surface engagement of the spider and output member to minimize the heat transfer from the ouput member to the spider.

16 Claims, 2 Drawing Figures

FLUID COUPLING DEVICE AND FAN MOUNTING ARRANGEMENT

BACKGROUND OF THE DISCLOSURE

The present invention relates to an assembly of a fluid coupling device and a fan, and more particularly, to an improved arrangement for attaching a fan to a fluid coupling device.

It will become apparent to those skilled in the art from the subsequent description that the mounting arrangement of the present invention may be utilized advantageously with various types of fans, as well as various types of fluid coupling devices. However, the invention is especially useful for attaching a radiator cooling fan for cooling a vehicle engine to a viscous fan drive, and the invention will be described in connection therewith. The invention is also especially useful when the fan is of the type having a hub portion and fan blades molded integrally from a plastic material, and an annular metal spider having its outer periphery attached to the hub portion and its inner periphery attached to the output coupling member of the viscous fan drive.

Because of the recent trend toward smaller automobiles, and the resultant decrease in volume of engine compartments, there has been more of a need to decrease the axial dimensions of many of the engine accessories. This need has been evident in regard to the overall axial dimension of the radiator cooling fan and viscous fan drive combination. Conventionally, fans have been rear-mounted on fan drives, but the need to reduce the axial dimension has been one factor in the trend toward front-mounting of the fan. Therefore, although the present invention may be used advantageously with either a rear-mounted or front-mounted fan, it is especially useful for a front-mounted fan and will be described in connection therewith.

Originally, almost all radiator cooling fans were assemblies of metal stampings. An attempt was made to reduce the weight and cost of cooling fans by making them from plastic moldings, but the heat generated by the viscous fan drive, when conducted to the plastic fan, frequently caused distortion of the fan, and eventual deterioration of the plastic material.

In an attempt to overcome the problem of heat transfer from the viscous fan drive to the plastic fan, those working in this art developed the fan assembly referred to previously, including the plastic hub and annular metal spider attached to the viscous fan drive. An example of such a fan assembly is illustrated in U.S. Pat. No. 3,642,382. It has become conventional practice on any type of fan having an annular metal spider for the spider to define an annular pilot surface which engages a pilot diameter on the output member of the fan drive to be sure the fan is precisely centered before bolting the spider to the fan drive. In the prior art, the pilot diameter has been disposed radially inwardly of the bolt circle, resulting in a substantial amount of surface-to-surface engagement between the spider and the fan drive.

Accordingly, it is an object of the present invention to provide an arrangement for attaching a fan assembly to a viscous fan drive which reduces the heat transfer from the fan drive to the metal spider by reducing the area of surface-to-surface engagement between the fan drive and the annular metal spider.

Efforts to increase the heat dissipation from the body (output coupling member) of the fan drive resulted in the development of a "blower body" fan drive, which is illustrated in U.S. Pat. No. 3,272,292, assigned to the assignee of the present invention. The blower body fan drive, in addition to dissipating heat from the body, draws air radially outward over the forward surface of the fan drive to minimize stagnation of air around the temperature responsive device which determines the temperatures at which the fan drive engages and disengages. It should be apparent that the standard front-mounting arrangement would interfere with the blower body front fins and the fins would, in some cases, make it more difficult to machine the pilot diameter.

Accordingly, it is another object of the present invention to provide an arrangement for attaching the annular metal spider of a combination metal-plastic fan to a fan drive of the blower body type, without seriously reducing the effective area of the front cooling fins.

SUMMARY OF THE INVENTION

The above and other objects of the present invention are accomplished by the provision of an improved combination of a fluid coupling device and a fan assembly. The fluid coupling device is of the type including an input coupling member, an output coupling member, and means transmitting torque between the input and output members. The fan assembly includes an annular hub portion, a plurality of fan blades projecting radially from the hub portion, and a generally annular spider portion attached, adjacent its outer periphery, to the hub portion and, adjacent its inner periphery, to the output coupling member by fasteners. The output coupling member defines a pilot diameter and the annular spider portion defines an annular pilot surface engaging the pilot diameter. The improvement comprises the output coupling member including a plurality of fastener receiving means defining a fastener circle having a radius $R_1$ and at least one pilot portion providing the pilot diameter, the pilot portion being configured such that the pilot diameter has a radius $R_2$, wherein $R_2$ is greater the $R_1$.

DESCRIPTION OF THE PREFERRED EMBODIMENT

Figure 1:
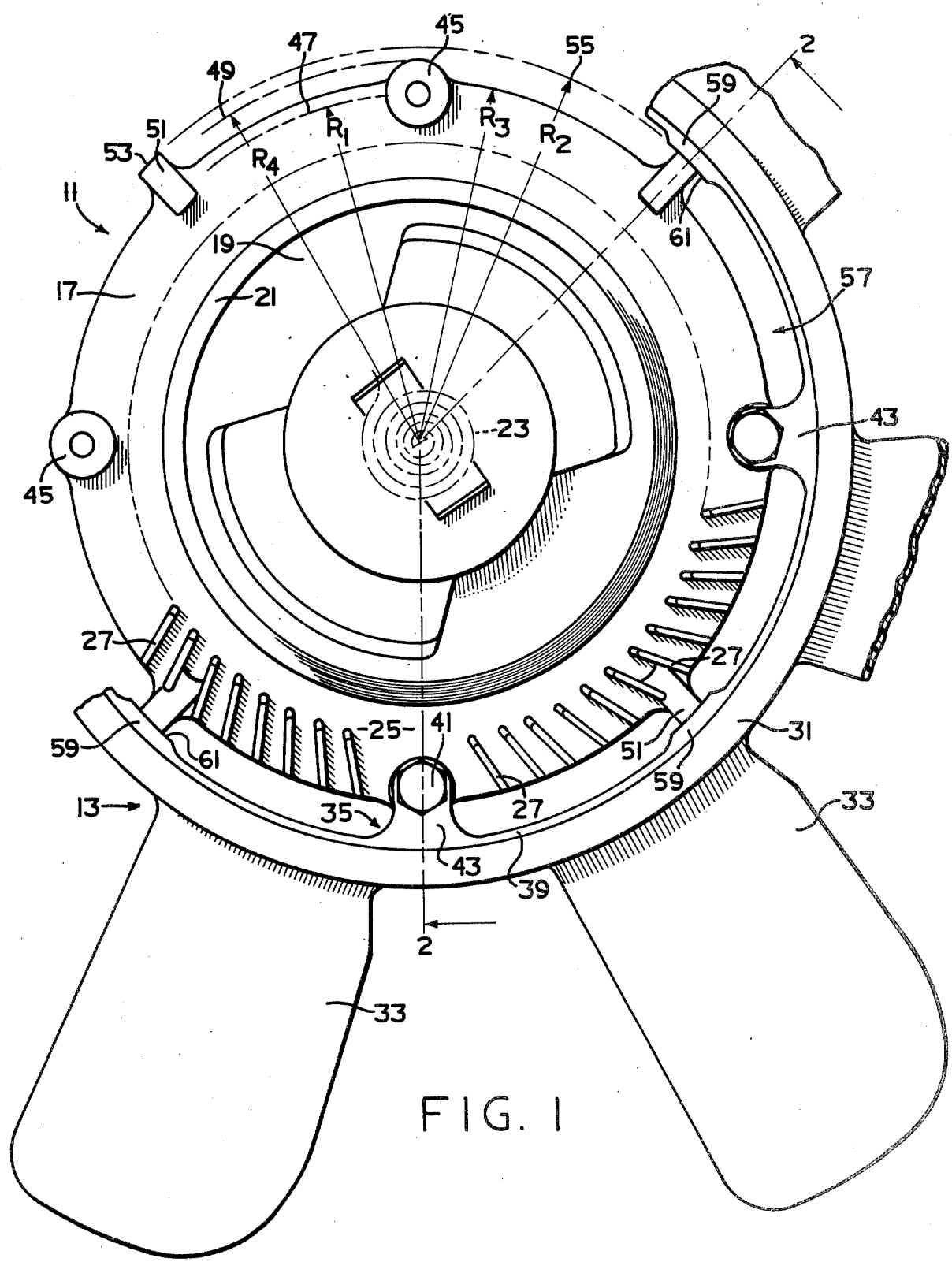
FIG. 1 is a partly fragmentary front plan view of the fan and fan drive combination of the present invention.

The drawing figures illustrate a combination of a fluid coupling device and a fan assembly. In the preferred embodiment, the fluid coupling device comprises a viscous fan drive, generally designated 11, and the fan assembly comprises a radiator cooling fan for a vehicle engine, and is generally designated 13. The viscous fan drive 11 may be of conventional construction, well known in the art, as is illustrated in previously cited U.S. Pat. No. 3,272,292 which is incorporated herein by reference. The viscous fan drive 11 includes an input shaft 15 (FIG. 2) on which is mounted an input coupling member 16. The input coupling member is surrounded by an output coupling member 17 and the input and output members cooperate to define a shear space (not shown) which, when it contains a quantity of viscous fluid, makes it possible to transmit torque from the input coupling member to the output coupling member 17.

The viscous fan drive 11 includes a cover member 19 held in fixed engagement with the output coupling member 17 by means of a rolled-over lip portion 21. Mounted on the cover member 19, and shown only schematically in FIG. 1, is a temperature-responsive, bimetal coil 23 which is operatively connected to the valving (not shown) within the fan drive 11 to determine the temperatures at which engagement and disengagement occur, as is well known in the art. The output coupling member 17 defines a forward surface 25, the terms "forward" and "front" as used herein being understood to indicate the side or portion of the fan drive 11 or fan 13 which is adjacent the vehicle radiator in a conventional vehicle arrangement. Extending forwardly from the front surface 25 is a plurality of front cooling fins 27, thus making the fan drive 11 of the "blower body" type.

The fan assembly 13 includes an annular hub portion 31 and a plurality of fan blades 33, extending radially from the hub portion 31. In the subject embodiment, the hub portion 31 and fan blades 33 are formed integrally from a plastic material, typically by injection molding. The fan assembly 13 also includes a spider, generally designated 35, which preferably comprises a single-piece metal stamping. The spider 35 includes a cylindrical spider portion 37 (shown in FIG. 2), and an annular spider portion 39.

In the subject embodiment, the fan assembly 13 is attached to the output coupling member 17 by a plurality of bolts 41, although it should be understood that within the scope of the invention other fastener means may be utilized. Each of the bolts 41 passes through a bolt tab 43, and into an internally-threaded bolt boss 45. The bolt tab 43 is an inwardly extending portion of the annular spider 39 and preferably, is stamped integrally therewith. The bolt bosses 45 may be cast integrally with the output coupling member 17 and define a bolt circle 47 (indicated by the broken line in FIG. 1), the bolt circle 47 having a radius $R_1$. As may best be seen in FIG. 1, the outer periphery of the output coupling member 17 defines a radius $R_3$, while the bolt bosses 45 are positioned such that their outer peripheries define a circle (designated 49 in FIG. 1) having a radius $R_4$. In the subject embodiment, the radius $R_4$ is greater than the radius $R_3$, i.e., the bolt bosses 45 are disposed radially outwardly as far as possible, without weakening them, partly to reduce the radially inward extent of the bolt tabs 43.

Intermediate each adjacent pair of bolt bosses 45 is a pilot boss 51 having an outer, peripheral surface 53. By way of example only, the subject embodiment includes four bolt bosses 45 and four pilot bosses 51 such that the four outer peripheries 53 define a pilot diameter 55 (indicated by a broken line in FIG. 1). The pilot diameter 55 has a radius $R_2$, and it is one feature of the present invention that the radius $R_2$ is greater than the radius $R_1$ of the bolt circle, and it is preferred that the radius $R_2$ also be greater than the radius $R_3$ to provide a radial opening or gap 57 between the outer periphery of the output coupling member 17 and the major portion of the inner periphery of the annular spider portion 39. It is also preferred that the radius $R_2$ be greater than the radius $R_4$ to facilitate machining of the outer peripheries 53 without interference from the outer periphery of the bolt bosses 45. Although the preferred embodiment includes a plurality of pilot bosses 51 and surfaces 53, the pilot diameter 55 may be defined by one continuous surface, or in any of several other ways believed to be obvious in view of the present specification. For purposes of the invention, it is the location of the pilot surface 55, and not the manner in which it is defined, which is important.

The annular spider 39 includes a plurality of pilot tabs 59, each of which extends radially inward toward one of the pilot bosses 51. Each pilot tab includes an inner surface 61, the surfaces 61 cooperating to define an annular pilot surface having a radius which varies from $R_2$ by the normal manufacturing tolerances applicable to stamped spiders and machined pilot diameters. Although the surfaces 53 and 61 have been described as defining circles, it should be understood that the surfaces 53 and 61 do not necessarily have to comprise an arc of a circle, but may have any other suitable configuration, such as straight. Preferably, each of the pilot tabs 59 is stamped integrally with the annular spider 39.

Figure 2:
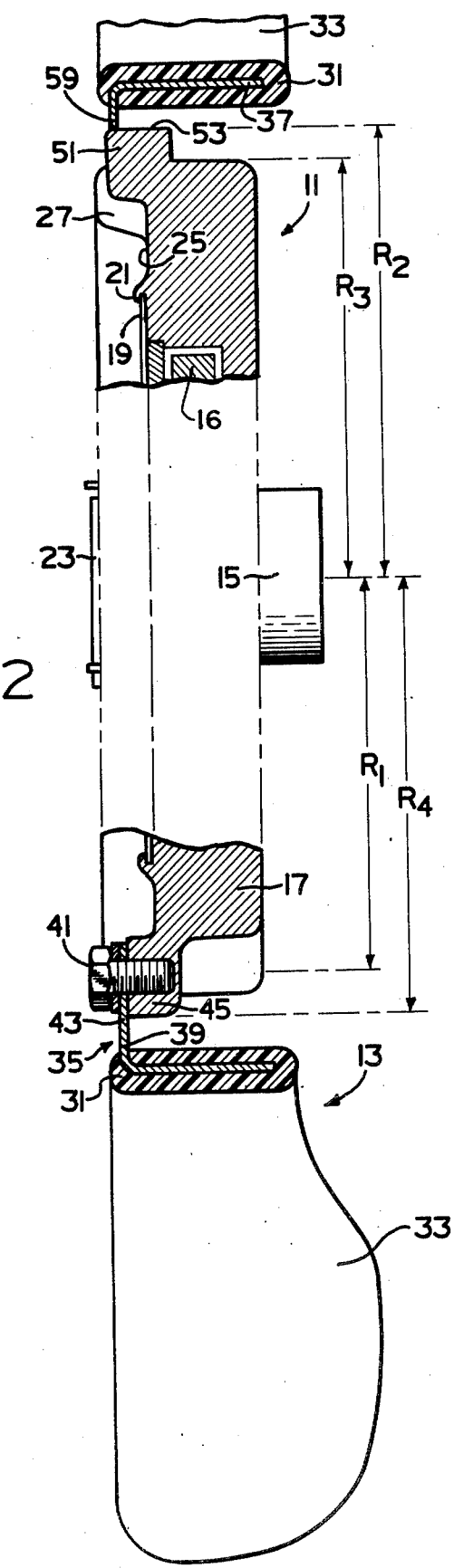
FIG. 2 is a partly fragmentary cross section, taken on line 2—2 of FIG. 1.

As was discussed in the background of the present specification, it is important in many applications for fan and fan drive assemblies to reduce the axial extent of the assembly to an absolute minimum. As may best be seen in FIG. 2, it is a feature of the present invention that the fan mounting arrangement disclosed herein helps to accomplish the above object. It is generally recognized as desirable to have the cylindrical spider portion 37 of nearly the same axial extent as the hub portion 31 to maximize the strength of the engagement therebetween. With such an arrangement, the annular spider portion 39 engages the hub portion 31 adjacent the front thereof. It will be appreciated that by having the annular spider portion 39 pilot on the OD of the rolled over lip portion 21, and engage the forward surface 25 (as was done in the prior art), the fan assembly 13 (configured as shown in FIG. 2) would be positioned substantially rearward of its location in FIG. 2, relative to the fan drive 11, thus substantially increasing the overall axial length of the fan and fan drive assembly. However, using the fan mounting arrangement of the present invention, in conjunction with the optional feature of the bolt bosses 45 and pilot bosses 51 projecting forwardly of the forward surface 25, makes it possible to assemble a fan drive and fan such that the fan drive is located within the axial confines of the hub portion 31, to the extent possible, by selecting the appropriate height, or forward projection, of the bolt bosses 45 and pilot bosses 51. Although not an essential feature of the present invention, it is preferred that each of the pilot tabs 59, each of the bolt tabs 43, and the annular spider portion 39 all be co-planar, i.e., lie in the same plane. This provides an advantage as far as the rigidity of the entire spider, as well as the complexity and cost of manufacture.

It is generally appreciated by those skilled in the viscous fan drive art that the greatest heat generation occurs in the region of the shear space (radially inward from the outer periphery of the cover 19), and that the temperature of the output coupling member 17 progressively decreases toward the outer periphery of the member 17. Using the present invention, heat generation becomes a minimum at the outer peripheries 53 of the pilot bosses 51. Accordingly, the fan mounting arrangement of the present invention substantially reduces the transmission of heat from the fan drive to the plastic fan in two ways; first, by greatly reducing the amount of surface-to-surface engagement between the output member 17 and the spider, and second, by positioning any such necessary surface-to-surface engagement at relatively cooler portions of the output member 17. In addiition, the fan mounting arrangement disclosed herein facilitates the machining of the pilot diameter and attachment of a fan to various fan drive configurations. In particular, it facilitates front-mounting of a combination metal-plastic fan on a blower body fan drive, while permitting the front fins to project forwardly of the annular spider portion.

I claim:

1. In the combination of a fluid coupling device and a fan assembly, the fluid coupling device including an input coupling member, an output coupling member, and means for transmitting torque between the input and output coupling members, the fan assembly including an annular hub portion, a plurality of fan blades projecting radially from the hub portion and a generally annular spider portion attached, adjacent its outer periphery, to the hub portion and, adjacent its inner periphery, to the output coupling member by fastener means, the output coupling member defining a pilot diameter and the annular spider portion defining an annular pilot surface engaging the pilot diameter, the improvement comprising:

(a) the output coupling member including a plurality N of fastener receiving means defining a fastener circle having a radius $R_1$ and a plurality of pilot portions providing the pilot diameter, the pilot diameter having a radius $R_2$, wherein $R_2$ is greater than $R_1$; the output coupling member having a radius $R_3$, $R_2$ being greater than $R_3$; and (b) the annular spider portion includes a plurality N of inwardly extending fastener tabs corresponding to said plurality N of fastener receiving means, the annular pilot surface defined by the spider portion engaging the outer periphery of each of said plurality of pilot portions to minimize heat transfer from the output coupling member to the annular spider portion.

2. The improvement as claimed in claim 1 wherein the fastener means comprises a plurality N of bolts, and the fastener receiving means comprises a plurality N of internally threaded portions adapted to receive said bolts.

3. The improvement as claimed in claim 2 wherein the annular spider portion includes a plurality N of inwardly extending bolt tabs adapted to engage said internally-threaded portions and be fixedly attached thereto by said bolts.

4. The improvement as claimed in claim 3 wherein the output coupling member includes a plurality of front cooling fins projecting forwardly therefrom, the annular spider portion being configured to permit said cooling fins, disposed circumferentially between said internally-threaded portions, to project forwardly of the annular spider portion.

5. The improvement as claimed in claim 4 wherein said internally-threaded portions comprise bosses projecting forwardly of the output coupling member.

6. The improvement as claimed in claim 3 wherein said output coupling member includes a plurality N of pilot portions, one of said pilot portions being disposed intermediate each adjacent pair of internally-threaded portions.

7. The improvement as claimed in claim 6 wherein the annular pilot surface defined by the annular spider portion is provided by a plurality N of inwardly extending pilot tabs, each of said pilot tabs engaging the outer periphery of one of said pilot portion.

8. The improvement as claimed in claim 7 wherein the output coupling member includes a plurality of front cooling fins projecting forwardly, the annular spider portion being configured, circumferentially between each adjacent pair of bolt tabs, to permit said front cooling fins to project forwardly of the annular spider portion.

9. The improvement as claimed in claim 1 wherein the annular spider portion further includes a generally cylindrical portion, the hub portion being made of a plastic material and disposed in a generally surrounding relationship to said cylindrical portion of the spider such that the annular spider portion engages the hub portion adjacent the front thereof.

10. The improvement as claimed in claim 9 wherein the output coupling member defines a forward surface and said plurality of fastener receiving means comprises a plurality of bosses projecting forwardly of said forward surface.

11. The improvement as claimed in claim 10 wherein the pilot portion providing the pilot diameter projects forwardly of said forward surface, the annular spider portion including a plurality of inwardly extending fastener tabs, each of which engages one of said plurality of bosses.

12. The improvement as claimed in claim 11 wherein the annular pilot surface defined by the annular spider portion and said fastener tabs are substantially co-planar.

13. The improvement as claimed in claim 10 wherein the outer peripheries of said bosses define a cylinder having a radius $R_4$ wherein $R_4$ is less than $R_2$ to permit machining of said pilot portion and the pilot diameter.

14. In the combination of a fluid coupling device and a fan assembly, the fluid coupling device including an input coupling member, an output coupling member and means for transmitting torque between the input and output coupling members, the fan assembly including an annular hub portion, a plurality of fan blades projecting radially from the hub portion, and a generally annular spider portion attached, adjacent its outer periphery, to the hub portion adjacent the front thereof and, adjacent its inner periphery to the output coupling member by fastener means, the output coupling member defining a pilot diameter, a forward surface and a plurality of fastener receiving means, and the annular spider portion defining an annular pilot surface engaging the pilot diameter, the improvement comprising:

(a) the fastener receiving means projecting forwardly of the front surface of the output coupling member; and (b) the pilot diameter being defined by at least one pilot portion projecting forwardly from the forward surface of the output coupling member to locate the pilot diameter forwardly of the forward surface, and adjacent the outer periphery of the output coupling member.

15. The improvement as claimed in claim 14 wherein the annular spider portion includes at least one inwardly extending fastener tab adapted to engage the fastener receiving means and further includes at least one inwardly extending pilot tab defining the annular pilot surface.

16. The improvement as claimed in claim 15 wherein the fastener tab and the pilot tab are substantially coplanar.

* * * * *